No. 736,653. PATENTED AUG. 18, 1903.
P. & L. TRABUE.
AUTOMATIC FOLDER OR TUCKER FOR BALING PRESSES.
APPLICATION FILED FEB. 27, 1903.
NO MODEL.
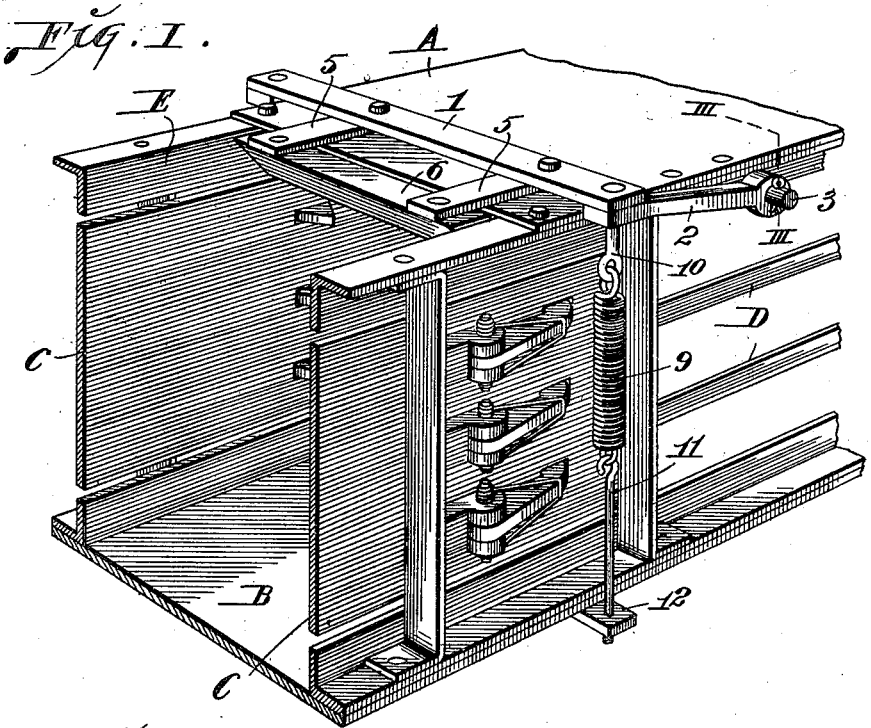
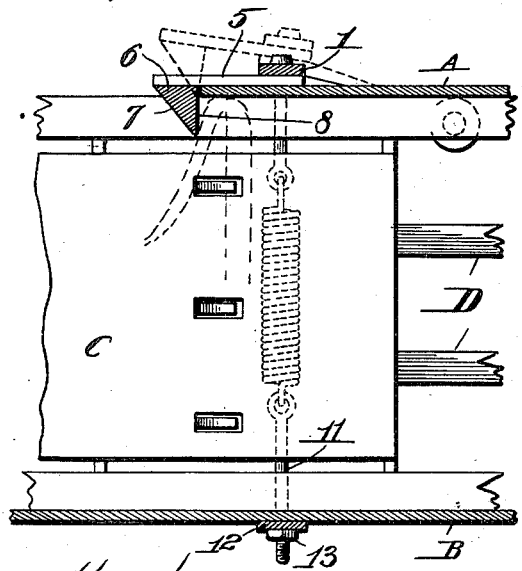
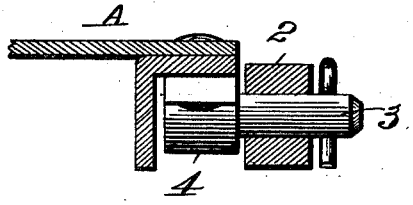
attest:—
M. P. Smith
F. S. Knight
Inventors:—
Paul Trabue and
Lyman Trabue:—
By Wright Bro
atty's No. 736,653. Patented August 18, 1903.

UNITED STATES PATENT OFFICE.

PAUL TRABUE AND LYMAN TRABUE, OF GIRARD, ILLINOIS.

AUTOMATIC FOLDER OR TUCKER FOR BALING-PRESSES.

SPECIFICATION forming part of Letters Patent No. 736,653, dated August 18, 1903.

Application filed February 27, 1903. Serial No. 145,364. (No model.)

*To all whom it may concern:*

Be it known that we, PAUL TRABUE and LYMAN TRABUE, citizens of the United States, residing in Girard, in the county of Macoupin and State of Illinois, have invented certain new and useful Improvements in Automatic Folders or Tuckers for Baling-Presses, of which the following is a full, clear, and exact description, reference being had to the accompanying drawings, forming part of this specification.

Our invention relates to a device for folding or tucking charges of hay as they are fed into the feed-opening of a baling-press and enter the baling-chamber, the object of the invention being to fold each charge in a manner to avoid ragged ends or uneven ends on the bales when completed.

The invention consists in features of novelty hereinafter fully described, and pointed out in the claim.

Figure I is a perspective view of a part of a baling-press equipped with our attachment. Fig. II is a vertical section taken through the press and our attachment. Fig. III is an enlarged section taken on line III III, Fig. I.

A and B designate, respectively, the top and bottom of a baling-press box, and C represents the side walls.

D is the baling-chamber, and E the feed-opening.

1 designates a cross-bar extending transversely of the press-box above the top A and carried by a pair of rocker-arms 2, that are journaled on pivot-stems 3, carried by brackets 4, which are attached to the top of the press-box. (See Fig. III.) The cross-bar 1 is located at the rear of the feed-opening E and carries arms 5, which project over the feed-opening and support a folder or tucker 6, preferably of triangular shape, as shown in Fig. II. The folder 6 is inclined downwardly and rearwardly at its forward side 7, so that the charge of hay may be readily forced past it, and at its rear side is formed with a vertical face 8, by which the charge of hay is directed rearwardly after it has passed the folder.

9 designates tension-springs, each secured at its upper end to eyebolts 10, attached to the cross-bar 1. The lower ends of the tension-springs 9 are connected to adjustment-rods 11, which pass through the projecting ends of a lower cross-bar 12, extending transversely of the bottom B of the press-box. The lower ends of the adjustment-rods 11 are threaded and have applied to them nuts 13, through the medium of which the rods 11 may be adjusted to increase or diminish the tension of the springs 9.

In the practical use of our attachment the charges of hay are forced into the baling-chamber from the feed-opening in the usual manner, and as each charge passes the folder 6 the folder is elevated by the pressure of hay thereagainst, and as soon as the charge of hay has passed the folder the tension-springs 9 draw the folder again into lowered position in front of the charge, carrying it downwardly, as illustrated by dotted lines, Fig. II, so as to leave no projecting wisps or straggling ends projecting from the bale.

We claim as our invention—

A device of the class described, comprising a cross-bar extending transversely of the press-box, above the top and in the rear of the feed-opening of the press, a pair of pivoted rocker-arms to which said cross-bar is secured, arms carried by the cross-bar and projecting over the feed-opening, a folder or tucker carried by said arms, and having its forward side inclined downwardly, and rearwardly, and its rear face vertical, eyebolts attached to the cross-bar, a lower cross-bar extending transversely of the bottom of the press-box, adjustable rods secured to the lower cross-bar and tension-springs connecting the eyebolts and the adjustable rods, substantially as described.

PAUL TRABUE.
LYMAN TRABUE.

In presence of—
LUTHER TRABUE,
J. H. TIETSORT.